United States Patent [19]

Kemski

[11] Patent Number: 4,939,008

[45] Date of Patent: Jul. 3, 1990

[54] COMPOSITE FILM

[75] Inventor: Michael B. Kemski, St. Paul, Minn.

[73] Assignee: Minnesota Mining and Manufacturing Company, St. Paul, Minn.

[21] Appl. No.: 232,863

[22] Filed: Aug. 16, 1988

[51] Int. Cl.$^5$ ............................ C09J 5/02; B32B 7/12; G03C 1/80; G11B 5/62
[52] U.S. Cl. ................................... 428/34.3; 428/336; 428/349; 428/412; 428/910; 428/447; 428/473.5; 428/474.4; 428/516; 428/480; 428/537.5
[58] Field of Search ..................... 428/412, 474.4, 336, 428/349, 34.3, 910, 483, 516, 480, 447, 473.5

[56] References Cited

U.S. PATENT DOCUMENTS

| | | | |
|---|---|---|---|
| 3,188,266 | 6/1965 | Charbonneau et al. | 161/188 |
| 4,418,164 | 11/1983 | Logullo, Sr. et al. | 523/207 |
| 4,749,617 | 6/1988 | Canty | 428/332 |

FOREIGN PATENT DOCUMENTS 0206669 12/1986 European Pat. Off. .

Primary Examiner—P. C. Ives
Attorney, Agent, or Firm—Donald M. Sell; Walter N. Kirn; James V. Lilly

[57] ABSTRACT

A composite film having strong interlayer bond strengths is disclosed. An aziridine-functional layer is employed to bond a top polyolefin layer to a polymeric bottom layer.

30 Claims, No Drawings

COMPOSITE FILM

TECHNICAL FIELD

The present invention relates to a composite film, that is, a film comprising at least three layers, and to articles made therefrom.

BACKGROUND ART

Composite films are known and have been used to make various articles such as magnetic recording tapes and discs, abrasives, flexible printing plates, printing label stock, adhesive tapes, photographic film, bags or pouches, uncoated films and the like.

Even though such films have many applications, there continues to be a desire and a need to provide better adhesion between the individual layers. A number of techniques have been employed for achieving such improved adhesion. They have included subjecting one or more of the surfaces to be joined to high energy (e.g., corona discharge, electron beam discharge, flame treatment and the like). Other techniques have included chemical treatment of one or more of such surfaces; and application of primers to one or more of the surfaces. Although these techniques have met with some success, they each require either that the surface of the film be treated before a top layer is applied, or that the entire film be subjected to UV light. This, of course, requires the use of additional equipment and processing time. Also, these techniques generally must be specifically designed to meet the requirements and/or characteristics of the specific end use. Furthermore, films produced by these techniques often have relatively low inter-layer bond strength (for example, from 400 to 1400 g/cm width).

Another technique to improve interlayer adhesion involves exposure of the joined surfaces to ultraviolet light such as is described in U.S. Pat. No. 3,188,266. Films made by this technique include polyester film bearing a polyolefin-based layer. These films, while finding wide utility as heat-sealable films, still exhibit inter-layer bond strengths only in the above-described range. Moreover the interlayer bond strengths of such films tend to diminish substantially with age.

Other techniques which generally address improving adhesion of one material to another are disclosed in U.S. Pat. No. 4,418,164, U.S. Pat. No. 4,749,617, and EPO 86.304526.6. U.S. Pat. No. 4,418,164 discloses coating aramid filaments with polyfunctional aziridines. The coated filaments are then totally encased in unsaturated polyester matrices to reinforce the polyester. The reinforced polyester is used as a casting resin to make molded parts.

U.S. Pat. No. 4,749,617 discloses a composite article wherein two rigid materials are joined to one another via an intermediate layer made up of an aziridine-functional material and an organic resin.

EPO 86.304526.6 discloses the application of a composition consisting essentially of at least one aziridine functionality or group to a substrate. Subsequently applied layers of magnetic recording media, photographic layers, adhesives, radiation sensitive compositions and silanes can be applied to the aziridine-treated surface.

SUMMARY OF THE INVENTION

The present invention is directed to a novel composite film with superior interlayer bond strengths. The films of the invention and articles made therefrom exhibit good resistance to delamination due to peel forces, shear loading, and flexural forces. They also preferably exhibit good resistance to delamination caused by chemical exposure and severe environmental conditions (i.e., elevated temperatures and high moisture exposure). The film comprises
  (a) a dimensionally stable polymeric first layer having opposed, substantially parallel major surfaces;
  (b) an aziridine-functional layer, which is essentially free from other organic resins, on at least one of said major surfaces; and
  (c) a polyolefin top layer on said aziridine functional layer.

The film of the invention typically exhibits inter-layer bond strengths greater than that of prior art films. Preferably, it has strengths at least two times greater than prior art films (e.g., 2800 g/cm-width). In fact, bond strengths in excess of 4000 g/cm-width have been recorded with some embodiments of the invention.

The film can be used in a wide variety of applications. For example, in one embodiment it can be used to make heat sealable articles such as bags or pouches. It may also be used as a substrate for any number of subsequently applied materials such as, by way of example, adhesives, radiation-sensitive materials, magnetic recording media, abrasives, and the like.

DETAILED DESCRIPTION

The film of the invention may be provided in a variety of forms including, by way of example, sheets, tapes, ribbons, discs, and the like. The film has opposed parallel surfaces and is generally substantially thinner than it is either wide or long. The film is typically from 10 to 300 microns ($\mu$) thick. The individual layers of the film may be of the same or different thickness. The modulus of the film typically is essentially indentical to that of the polymeric first layer. Thus, this property can be set by selection of a first layer having the desired modulus.

The first layer used in the invention can be selected from a wide range of polymeric materials. Examples of useful polymeric materials include polyesters (e.g., saturated and unsaturated, linear and branched) such as poly(ethylene terephthalate), poly(1,4-cyclohexylenedimethylene terephthalate), poly(ethylene naphthalate); polymers of maleic anhydride and ethylene glycol; polymers prepared from ethylenically unsaturated monomers such as polyethylene, polypropylene, polymethylmethacrylate, polyvinyl fluoride, polyvinylidene fluoride, polystyrene, polyvinyl chloride, polyvinyl acetate, polymethylmethacrylate, copolymers of ethylene and acrylic acid, copolymers of ethylene and vinyl acetate; polycarbonates such as the Lexan TM series of materials available from General Electric; polyimides such as the Kapton TM series of materials available from DuPont, polyamides such as Dartek TM series of nylon materials available from DuPont; cellulose acetates; polydimethylsiloxanes and the like. Oriented and unoriented polymeric surfaces may be used in the practice of the invention.

In a preferred embodiment the first layer comprises a difficultly heat sealable material. Such materials do not heat seal at normal heat sealing temperatures, that is at about 120° C., or they do so only with great difficulty. Most preferably, this layer is selected from the group consisting of polyesters (including the poly(alkylene terephthalates) and their copolyesters) and polyamides (including the polyhexamethylene adipamides).

A class of polymers particularly useful as the first layer is the poly(alkylene terephthalates) and their copolyesters. These polymers, many of which are available commercially, can be prepared by known techniques such as by the alcoholysis of esters of terephthalic acid with alkylene glycols and subsequent polymerization, or by heating the glycols with the free acids or with halide derivatives thereof with subsequent polymerization, and similar processes.

The alkylene units of the poly(alkylene terephthalates) generally contain from two to ten (preferably from two to four) carbon atoms. Most preferably they contain two carbon atoms. Specific examples of useful poly(alkylene terephthalates) include poly(ethylene terephthalate), poly(butylene terephthalate), poly(isobutylene terephthalate), poly(pentyl terephthalate), poly(isopentyl terephthalate), and poly(neopentyl terephthalate). The alkylene units may be straight or branched.

The thickness of the first layer is not critical to the invention and can vary over a wide range. Thus polymeric first layer of any thickness is suitable. It is noted, however, that the polymeric first layer usually accounts for the majority of the thickness of the film. In some cases, it can account for 95% or more of the thickness. Preferably, the polymeric first layer has a uniform thickness.

The aziridine-functional layer used in the invention is essentially free from other organic resins. This means that, although a minor amount of another organic resin may be present, that other resin comprises 10% or less by weight of the aziridine material present.

The aziridine-containing compound may also contain other functional groups. Preferably these groups are not reactive with the aziridine functionality under ambient conditions. Thus, for example, the aziridine-functional compound may also contain one or more hydroxyl groups.

The aziridine-functional compounds useful in the present invention may be represented by the formula

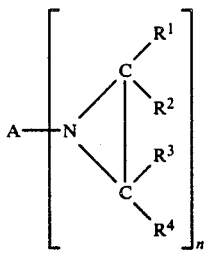

Formula (I)

wherein A is an n-valent organic or inorganic group, n is a whole number of at least one (preferably 2 to 4), and R, $R^2$, $R^3$, and $R^4$ may be the same or different and are individually selected from the group consisting of hydrogen and lower alkyl (branched or straight chain) groups containing from 1 to 8 (preferably from 1 to 4) carbon atoms.

The nitrogen atom of the aziridine group is preferably linked to an atom having a valence of 4 to 5 (most preferably C or P). Preferably, $R^1$, $R^2$, and $R^3$ are each hydrogen and $R^4$ is selected from hydrogen and alkyl containing from 1 to 4 (most preferably 1 to 2) carbon atoms.

"A" may be an aliphatic, aromatic or alicyclic organic radical which may contain atoms such as oxygen, sulfur, nitrogen, etc. "A" may also be an inorganic radical, such as

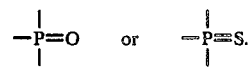

"A" preferably is

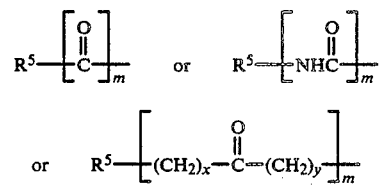

where $R^5$ is an m-valent aliphatic, aromatic or alicyclic radical which may contain atoms other than carbon, e.g., oxygen, nitrogen or sulfur, m is a whole number of at least 1, and x and y are individually 0, 1, or 2.

Specific examples of useful aziridine-containing materials include

A. "CX-100" available from Polyvinyl Chemical Industries and believed to have the formula

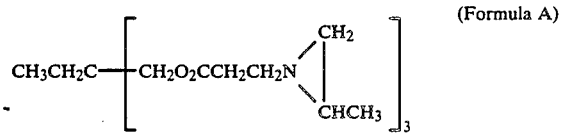

(Trimethylol-tris[-N[methylaziridinyl]]propionate)

B. "XAMA-7" available from Cordova Chemical Company and believed to have the formula

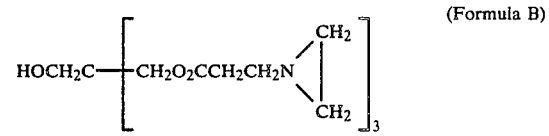

(Pentaerythritol-tris-(B-(N-Aziridinyl)Propionate)

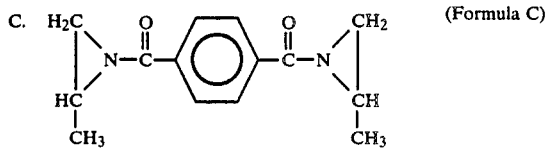

(1,1'-(1,3-phenylenedicarbonyl)bis[2-methyl aziridine])

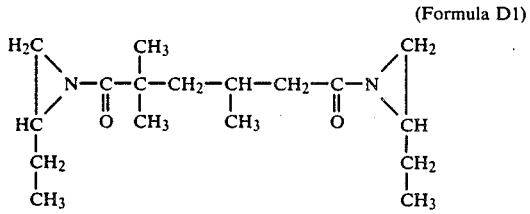

-continued

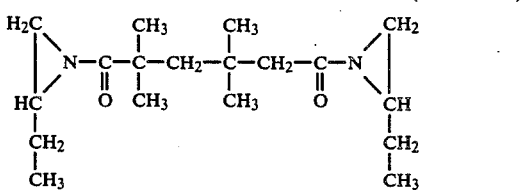
(Formula D2)

(1,1'-trimethyladipolyl bis[2-ethylaziridine])

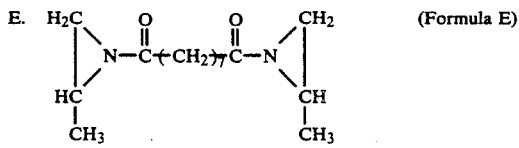
(Formula E)

(1,1'-azelaoyl bis[2-methyl aziridine])

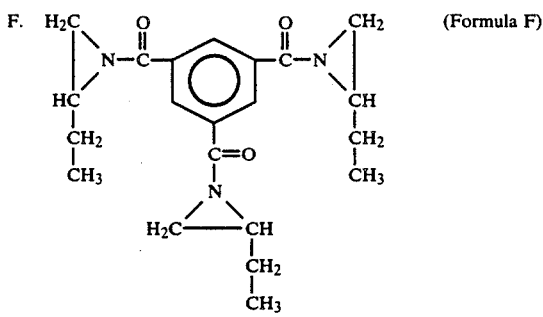
(Formula F)

(1,1',1''-(1,3,5-benzenetriyltricarbonyl)-tris[2-ethylaziridine])

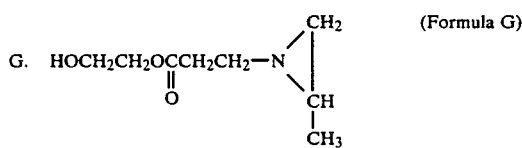
(Formula G)

(2-hydroxyethyl-3-(2-methyl aziridinyl)-propionate)

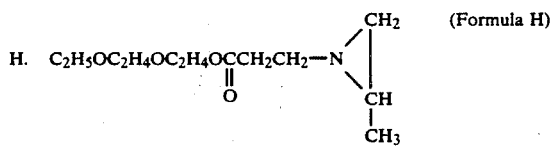
(Formula H)

(Ethoxy ethoxy ethyl-3-(2-methyl aziridinyl)-propionate)

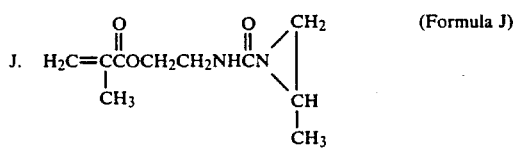
(Formula J)

(2-methyl aziridinyl-2-(2-methyl propenoyloxy)ethyl urea)

The aziridine-functional layer may vary in thickness if desired. However it has been found that this layer should have a calculated thickness of more than about 0.075 $\mu$ and more preferably more than about 0.1 $\mu$.

Although the layer may be as much as about 1 $\mu$ thick, no advantage has been noted at thicknesses of greater than about 0.4 $\mu$ thick. Preferably this layer is from about 0.1 to 0.4 $\mu$ thick.

The polyolefin top layer useful in the invention comprises a polymer of one or more ethylenically unsaturated monomers with one or more copolymerizable other monomers. Preferably the ethylenically unsaturated monomer comprises a material of the formula $C_yH_{2y}$ wherein y is a whole number of two or more (preferably from 2 to 4) or an unsaturated derivative thereof. Examples of polyolefins useful as the top layer are medium and high density polyethylene, propylene, ethylene/acrylic acid copolymers, and the like.

A particularly preferred class of polyolefins is heat-sealable. These materials can be readily heat sealed at temperatures as low as 110° C. after only a short (e.g., less than 2 seconds) exposure. A preferred subclass of such materials is the ethylene-acrylic acid (EAA) copolymers. These materials are thermoplastic copolymers. Typically they have a Vicat Softening point of from 75 to 95° C.

These EAA copolymers preferably have an acrylic acid content of at least 3% by weight of the polyolefin, more preferably from 3 to 20% by weight, and most preferably from 6 to 10% by weight.

The thickness of the EAA layer is not critical to the present invention and consequently may vary over a wide range. Thus, the film may have an EAA layer as thin as 2 microns. For many utilities, the EAA layer is preferably between about 5 and 50 $\mu$ and more preferably between about 8 and 20 $\mu$.

Examples of useful EAA copolymers are Prima Cor TM 3440, 3150, 5981 and 1430 all available from Dow and Adcote TM 50C12 and 50T4990 available from Morton Thiokol.

The film of the invention may be readily prepared. For example, the surface of the first layer may be preferably cleaned to remove dirt and grease using known cleaning techniques. The surface may then be contacted with a composition containing the aziridine-functional material using a variety of techniques such as Meyer rod coating, brushing, spraying, roll coating, curtain coating, knife coating, etc., and then processed at a time and for a temperature so as to provide the aziridine-functional layer.

A wide range of processing temperatures may be used to apply this layer. The particular temperature employed must not be so high as to degrade either the surface being treated or the aziridine functionality. Typical processing temperatures range from 15 to 250° C. Preferably the treated surface is processed at a temperature of from 70 to 140° C.

The treatment composition may comprise either the aziridine compound alone, a water or solvent solution of the aziridine, or a dispersion of the aziridine. The treatment composition typically comprises from about 0.02 to 15 (and preferably from about 0.2 to 1) percent by weight of the aziridine.

If water is employed as the liquid vehicle, it is preferred that a surfactant material also be included in the treatment composition. The surfactant may comprise up to 2.5 times the weight of the aziridine component in the treatment composition. Anionic, cationic, non-ionic, or amphoteric surfactant materials may be employed. Examples of useful surfactants include octylphenoxy ethanol, alkylaryl polyethersulfonates, ethoxylated fluorochemical alcohols, fluoroaliphatic polyesters, etc.

While the aziridine-functional composition employed in the present invention consists essentially of the aziridine compound, it is permissible to employ other ingredients such as slip agents, colorants (e.g., dyes and pigments), antioxidants, UV light stabilizers, and the like, (at up to 5 weight percent of the composition). Additionally, organic resins may also be added to up to 10 weight percent of the aziridine material may be employed as discussed above. These ingredients are essentially non-reactive with the aziridine under normal conditions. If reactive ingredients are employed, they must be present in amounts insufficient to prevent interaction between the substrate surface and the aziridine group.

The film of the invention is uniquely suited to being prepared by continuous in-line manufacturing or single pass processes. The aziridine-functional layer may be applied to either unoriented, partially oriented, or fully oriented webs. Treated unoriented or partially oriented webs may be further oriented if desired. Conventional orientation conditions may be used in such processes. Thus, the web may be stretched in the lengthwise direction by known techniques and subsequently stretched in the crosswise direction using known techniques. Alternatively, biaxially stretched in both directions at the same time.

A particularly useful manufacturing process comprises the steps of stretching the web in the lengthwise direction at 80-95° C., applying the treatment composition to the uniaxially oriented web at 100-120° C. then orienting in the crosswise direction, and then heat setting the biaxially oriented web at 200-250° C. Typically, polyester webs are oriented by being stretched to from 1 to 5 times their original dimension wherein the length to width stretch ratio may vary from 1:1 to 1:5 and from 5:1 to 1:1. Other stretch ratios may be used if desired. Typically, polypropylene webs are stretched from 1.8 to 5.5 times their original length and from 5.5 to 8.5 times their original width. Nylon webs are typically stretched from 2 to 3 times their original length and width.

The polyolefin layer may be applied using conventional techniques such as solution or dispersion coating and coextrusion. It may be applied prior to any orientation of the film, after orientation of the film in one direction, or after biaxial orientation.

Once the film of the invention has been made it may be either stored for extended periods of time and then further processed, or further processed immediately. In either event, the film may be converted into any number of articles, such as those described above.

The following examples are meant to further illustrate the invention.

POLYESTER BASE FILM

A polyester base film was prepared. An unoriented cast poly(ethylene terephthalate) film (hereinafter PET) was oriented in the length direction at 81° C. by stretching it to 3.2 times its original length. The uniaxially oriented film was coated with the following formulation:

| Ingredient | Parts by Weight |
| --- | --- |
| "CX-100" (Polyvinyl Chemical Industries) | 2.19 |
| De-ionized Water | 97.75 |

| Ingredient | Parts by Weight |
| --- | --- |
| "Triton" TX-100 (Rohm & Hass) | 0.06 |

The coating was applied using an air knife and dried at 93° C. for one minute in air. The film was then oriented in the width direction at 110° C. by stretching it to 4 times its width and then heat relaxed at an oven temperature of 230° C. to 3.7 times its width. The resultant biaxially oriented film was then heat set at 230° C. and was 74 microns thick. The coating layer had a calculated thickness of 0.3 micron.

EXAMPLE 1

A composite film according to the invention was prepared using the polyester base film. A 20 micron thick layer of Dow Prima Cor TM 3440 (a copolymer of 91% ethylene and 9.0% acrylic acid), was extruded onto the aziridine coated surface of the film at 282° C. and then cooled to 10° C.

A portion of the resulting film was then folded and heat sealed to itself (EAA to EAA) at 199° C. for two seconds at a pressure of 275 k Pa. After cooling, the heat sealed area was tested for integrity by a T-Peel test in an Instron Model 1199 Tester using a 12.70 cm/min (5 in/min) chart speed, a 5.08 cm (2 in) jaw gap, and a 12.70 cm/min (5 in/min) crosshead speed. The multilayer film broke before the heat seal bond failed.

COMPARATIVE EXAMPLE

A heat sealable film having a layer of 74 microns thick PET bearing a layer of 20 microns thick Dow Prima Cor TM 3330 EAA without the use of an intermediate layer was prepared using the techniques (including exposure to ultraviolet light) described in U.S. Pat. No. 3,188,266. The EAA layer of this film was heat sealed to the EAA layer of the film of Example 1 at 199° C. for two seconds and 275 kPa pressure. After cooling, the heat sealed area was tested for strength using the T peel test described in Example 1. When tested in this manner, there was 100% delamination of the EAA layer from the PET layer of the film of this comparative example. As noted in Example 1, there was no delimination of the EAA layer from the film of that example. This demonstrates the superior inter-layer bond strength of the film of the invention.

EXAMPLES 2-7

A series of multilayer films were prepared by Meyer rod coating the polyester base film with EAA dispersion solutions having different acrylic acid contents and allowing the EAA coating to dry. The resulting films were heat sealed to themselves (EAA to EAA) at 179° C. for 1.0 second and 275 kPa pressure. The heat sealed area was subjected to the T-peel test as described in Example 1 except the scale varied as indicated. The results of the Tests are given in Table 1.

TABLE 1

| Example No. | 2 | 3 | 4 | 5 | 6 | 7 |
| --- | --- | --- | --- | --- | --- | --- |
| EAA Layer | 20[(1)] | 20[(2)] | 1.5[(3)] | 3[(4)] | 9[(5)] | 20[(6)] |
| % Acrylic Acid | | | | | | |
| T-Peel Value (g/cm width) | 1250 | 1786 | 393 | 1214 | 2857 | 3214 |

TABLE 1-continued

| Example No. | 2 | 3 | 4 | 5 | 6 | 7 |
|---|---|---|---|---|---|---|
| Failure Mode[7] | P | P | D | D | T | P |

[1] Morton Thiokol Adcote ™ 50C12 EAA.
[2] Morton Thiokol Adcote ™ 50T4990 EAA (Vicat Softening Point 82° C.).
[3] Blend of Dow Prima Cor ™ 1430 EAA and Eastman 1550P LDPE (16/84) (Dispersion, Vicat Softening Point of 50° C. in cast film form).
[4] Dow Prima Cor ™ 3150 EAA.
[5] Dow Prima Cor ™ 1430 EAA (Vicat Softening Point 82° C.).
[6] Dow Prima Cor ™ 5981 EAA (Cast Film Vicat Softening Point 55° C.).
[7] *P = Peel or separation of the EAA from the EAA at the heat seal bond. D = Delamination of the EAA from the PET base film. T = Tear or break through the PET base film without failure of the heat seal bond, or peel or separation of the EAA from the EAA at the heat seal bond.

The data indicate that useful interlayer bond strengths are obtainable with various EAA copolymers. They further indicate that film of the invention preferably has an acrylic acid content of at least 3%.

EXAMPLES 8-12

Multilayer films according to the invention were prepared by applying Morton Thiokol Adkote ™ 50C12 EAA to the aziridine treated surface of the polyester base film. The EAA was applied at different thicknesses by using different wire wound Meyer Rods. The resulting multilayer films were heat sealed to themselves (EAA to EAA) at 127° C., for 4 seconds at a pressure of 275 kPa; and the heat sealed area was subjected to the T-peel test as described in Example 1. The results are given in Table 2.

TABLE 2

| Example No. | 8 | 9 | 10 | 11 | 12[1] |
|---|---|---|---|---|---|
| Meyer Rod No. | 6 | 10 | 20 | 30 | 30 |
| Dried EAA Coating Thickness (microns) | 8.9 | 14 | 15 | 18 | 15 |
| T-Peel Value (g/cm width) | 1786 | 1839 | 1822 | 1893 | 4197 |

[1] Heat seal conditions were 144° C. for 5 seconds at a pressure of 275 kPa.

There was no delamination of the EAA from the PET in any of the samples. The heat seal bond peeled EAA from EAA, indicating useful inter-layer bond strengths can be obtained, with a very thin coating of EAA.

EXAMPLES 13-19

Polyester base films were prepared as described in Polyester Base Film except that the thickness of the dried aziridine layer was varied. The base films were then coated with Dow Prima Core ™ 3330 as described in Example 1. Three samples of each of the resulting base films were then heat sealed at 143° C., for 2 seconds at a pressure of 275 kPa. The heat sealed area was subjected to the T-peel test described in Example 1. The results are given in Table 3.

TABLE 3

| Example No. | 13 | 14 | 15 | 16 | 17 | 18 | 19 |
|---|---|---|---|---|---|---|---|
| Calculated Aziridine Coating Thickness (microns) | 0.876 | 0.657 | 0.438 | 0.328 | 0.219 | 0.109 | 0.053 |
| Average T-Peel Value (g/cm width) | 3274 | 3215 | 3036 | 3215 | 2947 | 2322 | 0 |
| Failure Mode | P(1) B(2) | P(1) B(2) | P(1) B(2) | P(1) B(2) | B(3) | P(2) B(1) | D(3) |

P = Peel of EAA from EAA.
B = Break of backing.
D = Delamination of EAA from backing.

Only the samples of Example 19, exhibited delamination of the EAA from the coated surface. In all other samples, the PET broke or the EAA peeled from the EAA. The data indicate that useful bond strengths are obtained at a number of aziridine coating thicknesses.

EXAMPLES 20-21

Heat sealable films according to the present invention were prepared using either Dupont Dartex ™ Nylon R-2C2-1840 (hexamethylene-diamine adipic acid) or PET as the polymeric first layer. Three samples of each first layer (50 microns thick) were separately coated with an aziridine containing coating solution using a #12 Meyer Rod, dried at 71° C. for one minute in air, and cured at 163° C. for one minute in air. On to each sample was extruded a layer of Dow Prima Cor ™ 3330 EAA copolymer (40 microns thick) with a 6.5% acrylic acid content. The resulting film samples were heat sealed to themselves, EAA to EAA, at 179° C., for 25 seconds at a pressure of 275 kPa and subjected to the T-peel test described in Example 1. The results are given in Table 4.

TABLE 4

| Example No | 20 | 21 |
|---|---|---|
| Base Film | Nylon | PET |
| Coating (parts by weight) | | |
| CX-100 | 2.19 | 2.19 |
| TX-100 | 0.06 | 0.06 |
| De-ionized Water | 97.75 | 97.75 |
| Average T-Peel Value (g/cm width) | 1804 | — |
| Peak T-Peel Value (g/cm width) | 2214 | 2768 |
| Failure Mode | Peel | Break |

There was no delamination of the EAA from the base films of these examples. All samples of Example 20 peeled EAA from EAA. The PET base film of all samples of Example 21 broke at the peak T-peel value indicated.

EXAMPLE 22

An abrasive article was prepared by coating a phenolic resin based binder onto the EAA surface of the film of Example 1 and curing at 121° C. for 15 minutes. Calcined aluminum oxide particles were then applied manually to the phenolic binder. Lastly, a final phenolic binder coat was applied over the aluminum oxide particles and cured at 121° C. for 15 minutes. The resulting abrasive article was tested using a single flex test which was conducted by bending the article over a table corner with PET backing against the table edge and passing the article over the edge approximately ten times at an angle. There was no evidence of either delamination of the film layers or "shelling" (i.e., loss of particles of phenolic binder and abrasive particles) due to bond failure to the backing. This shows the presence of good bond adhesion between the backing, the film of the invention, and the phenolic binder.

I claim:

1. A film comprising
   (a) a dimensionally stable polymeric first layer having opposed, substantially parallel major surfaces;
   (b) an aziridine-functional layer which is essentially free from other organic resins on at least one of said major surfaces;
   (c) a polyolefin top layer on said aziridine-functional layer which has a calculated thickness of at least about 0.075 microns thick.

2. A film according to claim 1 wherein said aziridine-functional layer contains less than about 10 percent by weight of said aziridine functional material of said other resin.

3. A film according to claim 2 wherein said aziridine-functional layer contains a compound represented by the formula

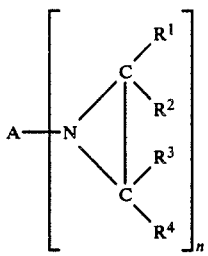

Formula (I)

wherein A is an n-valent organic or inorganic group, n is a whole number of at least one and $R^1$, $R^2$, $R^3$, and $R^4$ may be the same or different and are individually selected from the group consisting of hydrogen and lower alkyl groups containing from 1 to 8 carbon atoms.

4. A film according to claim 3 wherein the nitrogen atom of the aziridine group is linked to a carbon or phosphorous atom having a valence of 4 to 5.

5. A film according to claim 3 wherein A is selected from the group consisting of aliphatic, aromatic, and alicyclic organic radicals which may contain oxygen, sulfur and nitrogen, and inorganic radicals selected from the group consisting of

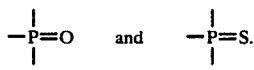

6. A film according to claim 5 wherein A is selected from the group consisting of

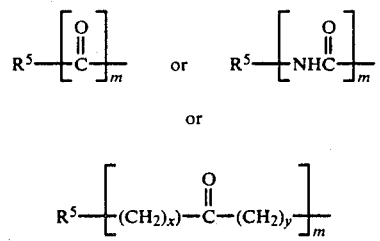

where $R^5$ is an m-valent aliphatic, aromatic or alicyclic radical which may contain atoms other than carbon, m is a whole number of at least 1, and x and y are individually 0, 1, or 2.

7. A film according to claim 6 wherein said compound has the formula

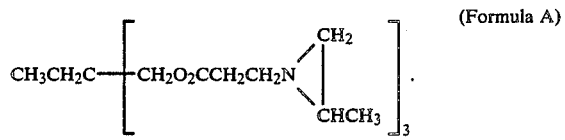

[(Trimethylol-tris[-N[methylaziridinyl])]propionate)]

8. A film according to claim 1 wherein said aziridine-functional layer has a calculated thickness of at least about 0.1 microns.

9. A film according to claim 3 wherein said aziridine-functional layer is applied from a composition comprising from about 0.02 to 15 percent by weight of said Formula I compound, up to about 2.5 times the weight of said Formula I compound of a surfactant, and water.

10. A film according to claim 3 wherein said polymeric first layer is selected from the group consisting of polyesters, polymers of maleic anhydride and ethylene glycol, polymers prepared from ethylenically unsaturated monomers, polyamides, polycarbonates, polyimides, cellulose acetate polymers, and polydimethyl siloxanes.

11. A film according to claim 10 wherein said first layer comprises a difficultly heat sealable polymeric material.

12. A film according to claim 11 wherein said difficultly heat sealable polymeric material is selected from the group consisting of polyesters and polyamides.

13. A film according to claim 12 wherein said difficultly heat sealable polymeric material is a polyester.

14. A film according to claim 13 wherein said polyester is a polyalkylene terephthalate which contains from two to ten carbon atoms in its alkylene unit.

15. A film according to claim 14 wherein said polyester is selected from the group consisting of poly(ethylene terephthalate), poly(butylene terephthalate), poly(isobutylene terephthalate), poly(pentyl terephthalate), poly (isopentyl terephthalate), poly(neopentyl terephthalate).

16. A film according to claim 15 wherein said polyester is poly(ethylene terephthalate).

17. A film according to claim 3 wherein said polyolefin top layer comprises a polyolefin prepared by the polymeriazation of (1) an ethylenically unsaturated monomer of the formula $C_yH_{2y}$ wherein y is a whole number of at least two or an unsaturated derivative thereof, and (2) a second monomer copolymerizable therewith.

18. A film according to claim 17 wherein said polyolefin is selected from the group consisting of medium and high density polyethylene, polypropylene, and copolymers of ethylene and acrylic acid.

19. A film according to claim 18 wherein said polyolefin is a copolymer of ethylene and acrylic acid.

20. A film according to claim 19 wherein said copolymer of ethylene and acrylic acid has an acrylic acid content of at least 3% by weight of said polyolefin.

21. A film according to claim 1 having an interlayer bond strength of at least 2800 g/cm-width.

22. A heat sealable film comprising a difficultly heat sealable polyester first layer, a readily heat sealable top layer selected from the group consisting of medium density polyethylene, high density polyethylene, polypropylene, and copolymers of ethylene and acrylic acid, and an intermediate aziridine-functional layer which is substantially from other organic resins wherein said intermediate layer contains an aziridine compound of the formula

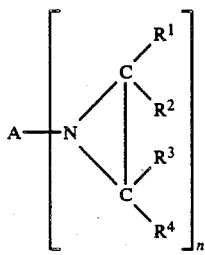

Formula (I)

23. A film according to claim 1 further comprising a further layer of material selected from the group consisting of adhesives, radiation sensitive materials, magnetic recording media, and abrasives on said polyolefin top layer.

24. A film according to claim 23 wherein said further layer comprises an adhesive.

25. A film according to claim 23 wherein said further layer comprises a radiation sensitive material.

26. A film according to claim 23 wherein said further layer comprises a magnetic recording media.

27. A film according to claim 23 wherein said further layer comprises an abrasive.

28. A film according to claim 1 which has been folded to place said top layer in contact with itself to form a pouch and wherein at least a portion of the edge of said pouch has been heated to seal said polyolefin to itself.

29. A film according to claim 1 wherein said film is oriented in at least one direction.

30. A film according to claim 29 wherein said film is biaxially oriented.

* * * * *

UNITED STATES PATENT AND TRADEMARK OFFICE
CERTIFICATE OF CORRECTION

PATENT NO.  : 4,939,008
DATED       : JULY 3, 1990
INVENTOR(S) : KEMSKI

It is certified that error appears in the above-identified patent and that said Letters Patent is hereby corrected as shown below:

Column 3, line 56, delete "$R,R^2,R^3$, and $R^4$" and insert therefor --$R^1,R^2,R^3$, and $R^4$--.

Column 6, line 1, delete "$\mu$thick," and insert therefor --$\mu$ thick,--.

Column 11, line 20, at the beginning of the line, before the word "resin," insert the word --organic--.

Signed and Sealed this

Tenth Day of September, 1991

Attest:

HARRY F. MANBECK, JR.

Attesting Officer

Commissioner of Patents and Trademarks